United States Patent
Grube et al.

(10) Patent No.: US 10,372,686 B2
(45) Date of Patent: *Aug. 6, 2019

(54) POLICY-BASED STORAGE IN A DISPERSED STORAGE NETWORK

(71) Applicant: International Business Machines Corporation, Armonk, NY (US)

(72) Inventors: Gary W. Grube, Barrington Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,078

(22) Filed: Jul. 28, 2016

(65) Prior Publication Data

US 2016/0335202 A1 Nov. 17, 2016

Related U.S. Application Data

(63) Continuation-in-part of application No. 14/612,422, filed on Feb. 3, 2015, now Pat. No. 9,571,577, which
(Continued)

(51) Int. Cl.
*G06F 11/00* (2006.01)
*G06F 11/08* (2006.01)
(Continued)

(52) U.S. Cl.
CPC .......... *G06F 16/1827* (2019.01); *G06F 11/00* (2013.01); *G06F 11/1084* (2013.01); *G06F 21/60* (2013.01); *G06F 21/62* (2013.01); *G06F 21/6218* (2013.01); *H04L 29/08549* (2013.01); *H04L 63/10* (2013.01); *H04L 67/1097* (2013.01); *G06F 11/08* (2013.01); *G06F 2211/1028* (2013.01);
(Continued)

(58) Field of Classification Search
CPC ..... G06F 2221/2113; G06F 2221/2141; G06F 2212/1052; H04L 67/1097; H04L 29/08549
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Madhuri R Herzog
(74) *Attorney, Agent, or Firm* — Garlick & Markison; Timothy W. Markison; Bruce E. Stuckman

(57) ABSTRACT

A method for execution by a dispersed storage and task (DST) processing unit operates to receive a write threshold number of slices of a data object and an access policy; determine a current timestamp that indicates a current time value; and store the write threshold number of slices, the access policy, and the timestamp in a plurality of storage units of a dispersed storage network (DSN).

20 Claims, 7 Drawing Sheets

Related U.S. Application Data is a continuation of application No. 12/886,368, filed on Sep. 20, 2010, now Pat. No. 8,990,585.

(60) Provisional application No. 61/290,757, filed on Dec. 29, 2009.

(51) Int. Cl.

| | | |
|---|---|---|
| *G06F 11/10* | (2006.01) | |
| *G06F 21/60* | (2013.01) | |
| *G06F 21/62* | (2013.01) | |
| *H04L 12/64* | (2006.01) | |
| *H04L 29/06* | (2006.01) | |
| *H04L 29/08* | (2006.01) | |
| *G06F 16/182* | (2019.01) | |

(52) U.S. Cl.
CPC ........... *G06F 2212/1052* (2013.01); *G06F 2221/2137* (2013.01); *G06F 2221/2141* (2013.01); *G06F 2221/2151* (2013.01); *H04L 2012/6467* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 7,734,595 | B2 * | 6/2010 | Margolus .......... G06F 17/30368 707/609 |
| 8,825,971 | B1 * | 9/2014 | Auchmoody ....... G06F 11/1453 711/162 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0120949 | A1 * | 6/2003 | Redlich ............ C07K 14/70575 726/21 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0061543 | A1 * | 3/2007 | Uppala ............. G06F 17/30587 711/173 |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2008/0104204 | A1 * | 5/2008 | Moore .................. G06F 3/0608 709/219 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

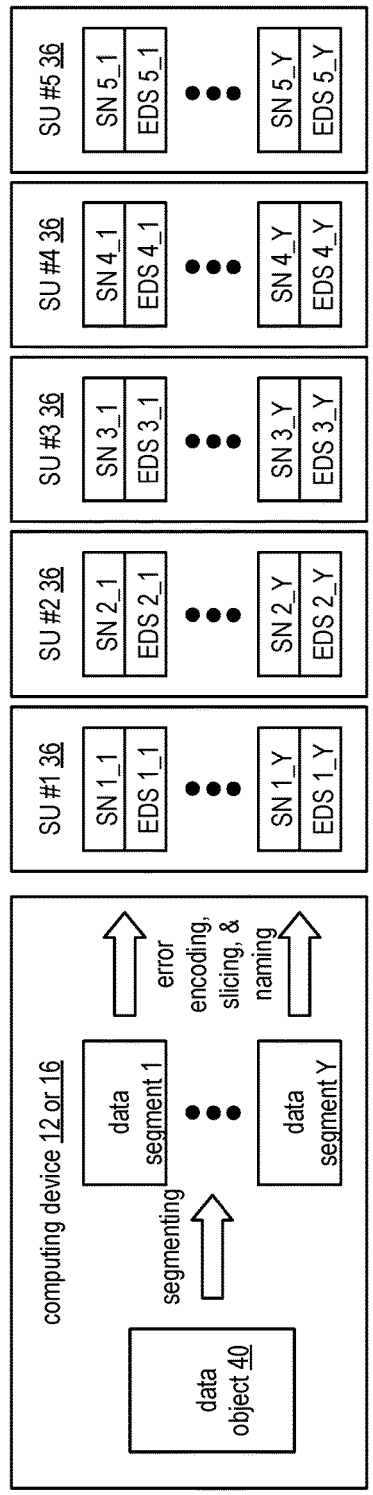
FIG. 3
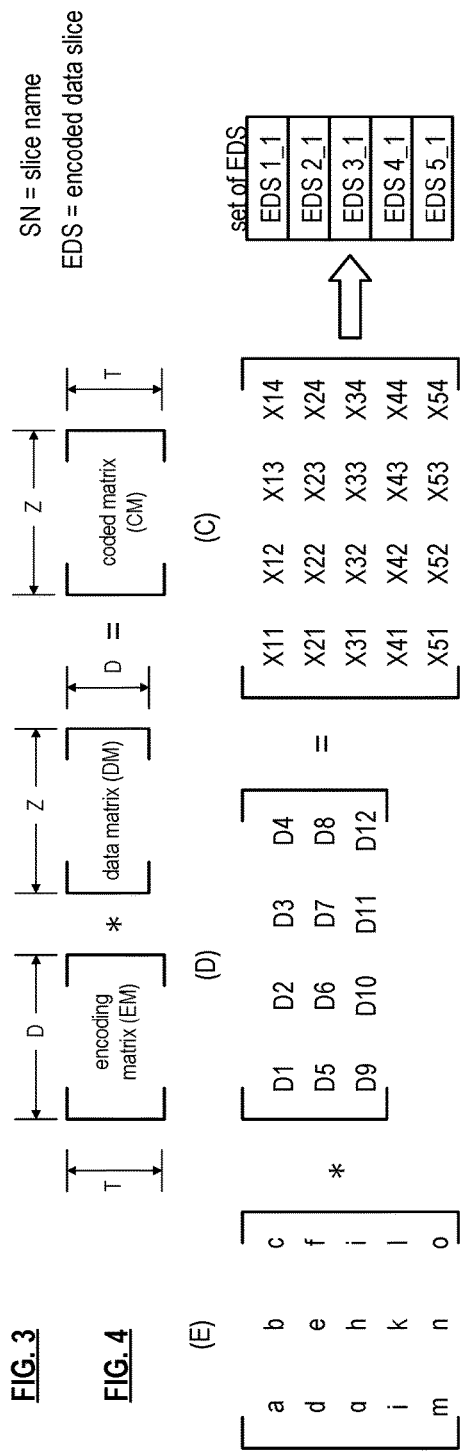
FIG. 4
FIG. 5
FIG. 6

POLICY-BASED STORAGE IN A DISPERSED STORAGE NETWORK

CROSS-REFERENCE TO RELATED APPLICATIONS

The present U.S. Utility patent application claims priority pursuant to 35 U.S.C. § 120 as a continuation-in-part of U.S. Utility application Ser. No. 14/612,422, entitled "TIME BASED DISPERSED STORAGE ACCESS", filed Feb. 3, 2015, which is a continuation of U.S. Utility application Ser. No. 12/886,368, entitled "TIME BASED DISPERSED STORAGE ACCESS", filed Sep. 20, 2010, issued as U.S. Pat. No. 8,990,585 on Mar. 24, 2015, which claims priority pursuant to 35 U.S.C. § 119(e) to U.S. Provisional Application No. 61/290,757, entitled "DISTRIBUTED STORAGE TIME SYNCHRONIZATION", filed Dec. 29, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
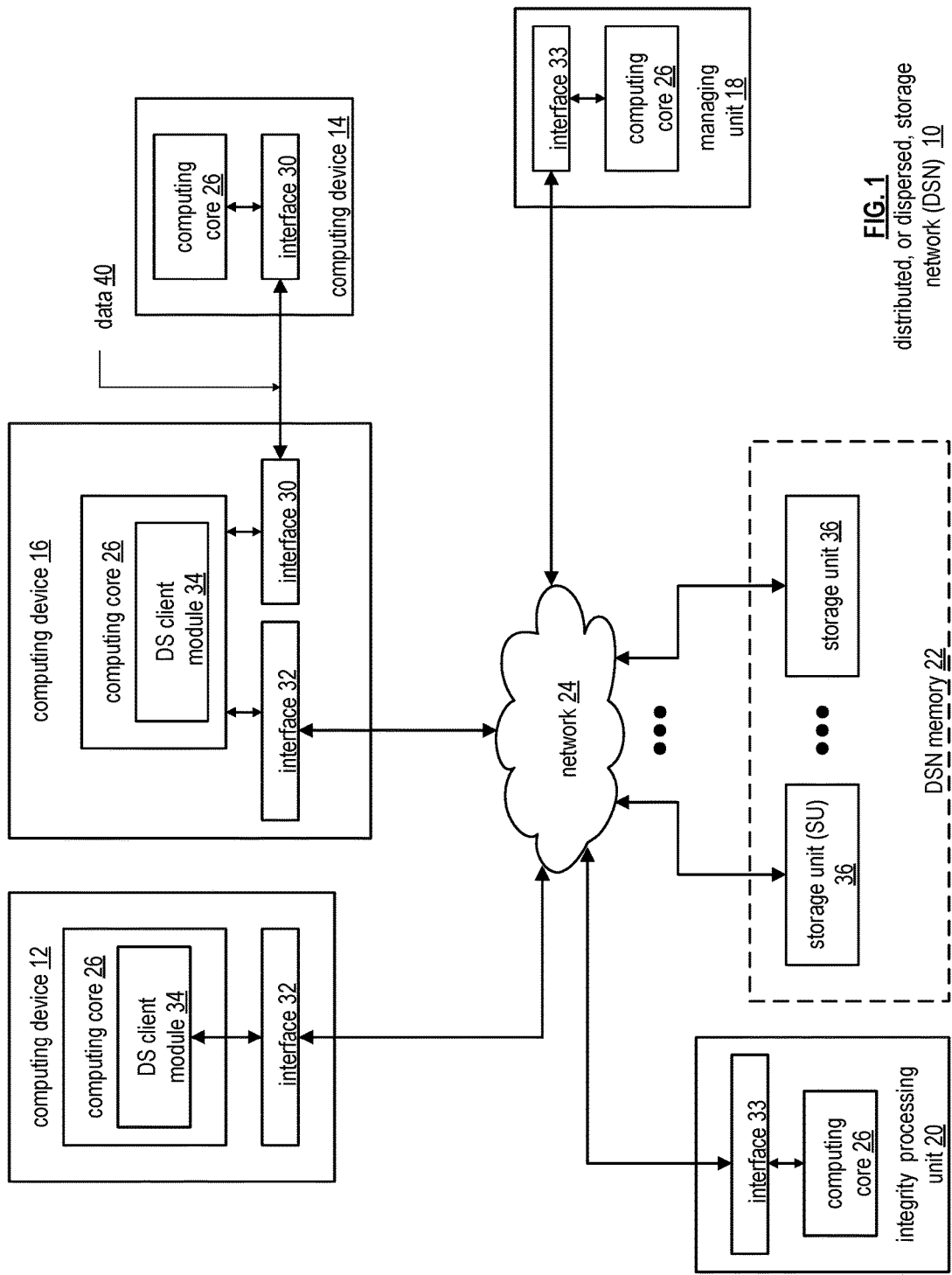
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
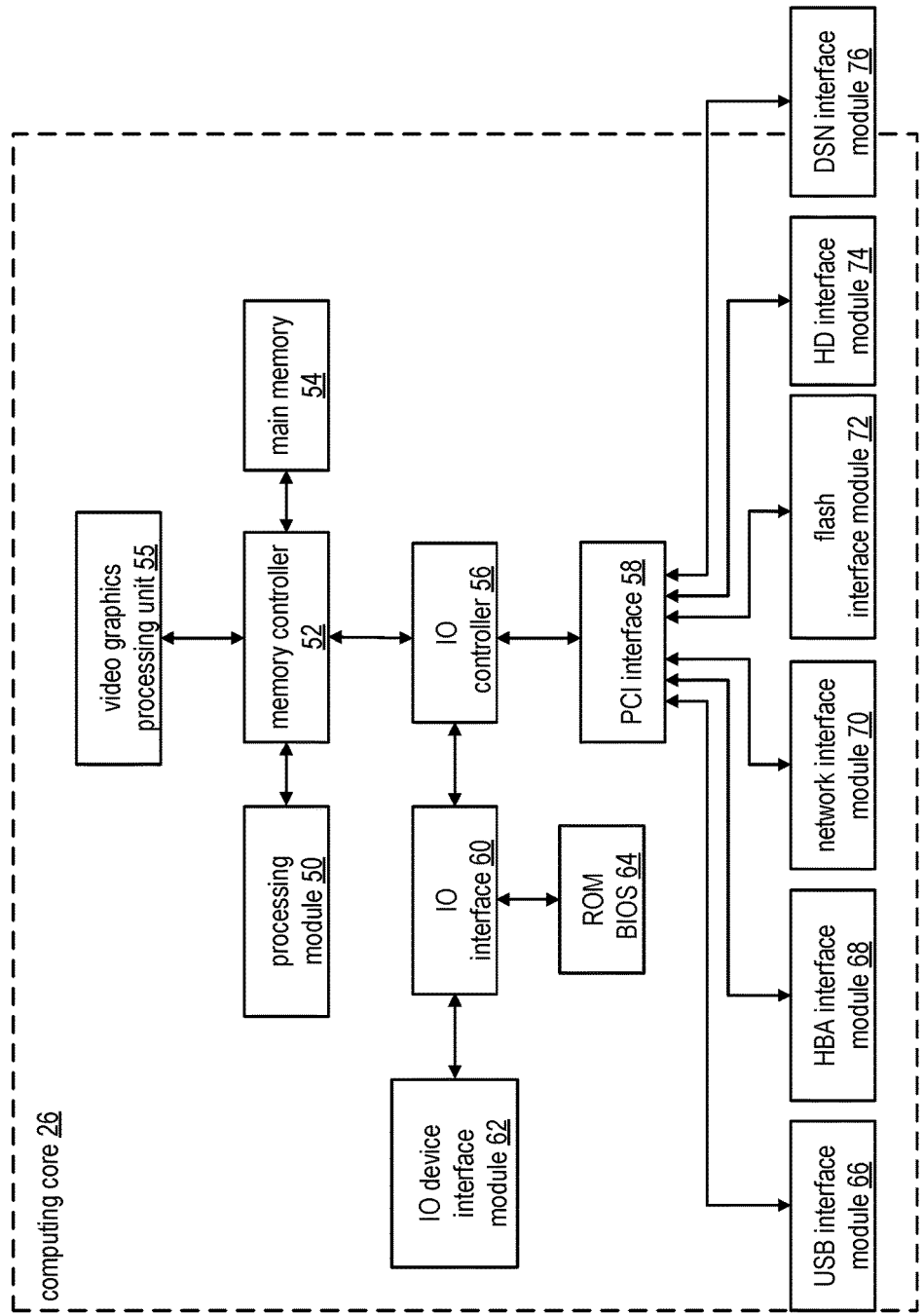
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data). In various embodiments, computing devices 12-16 can include user devices and/or can be utilized by a requesting entity generating access requests, which can include requests to read or write data to storage units in the DSN.

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
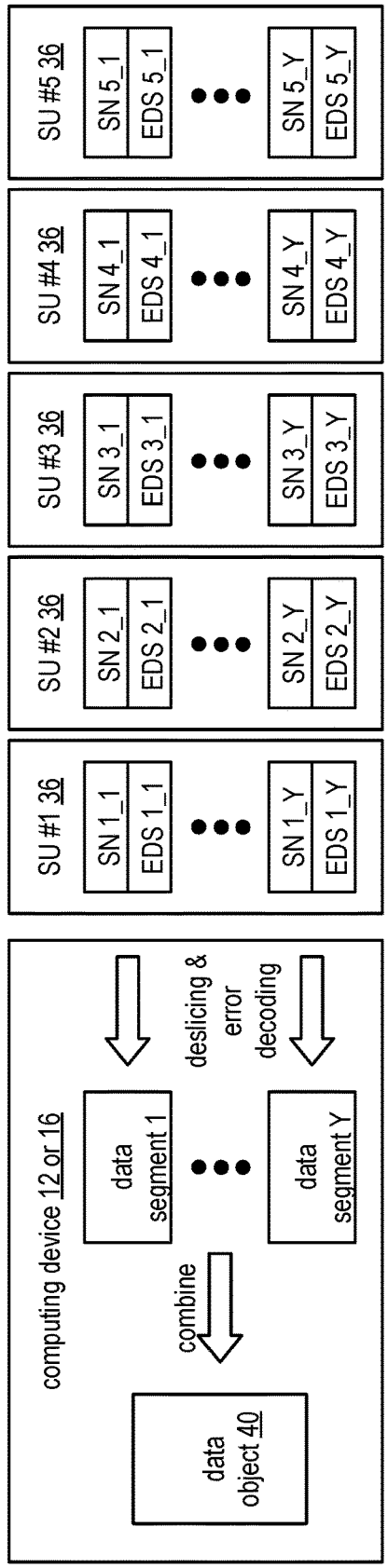
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
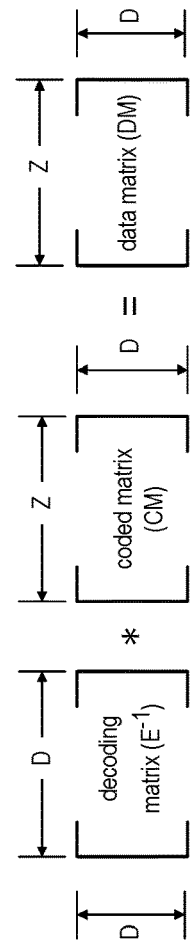
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
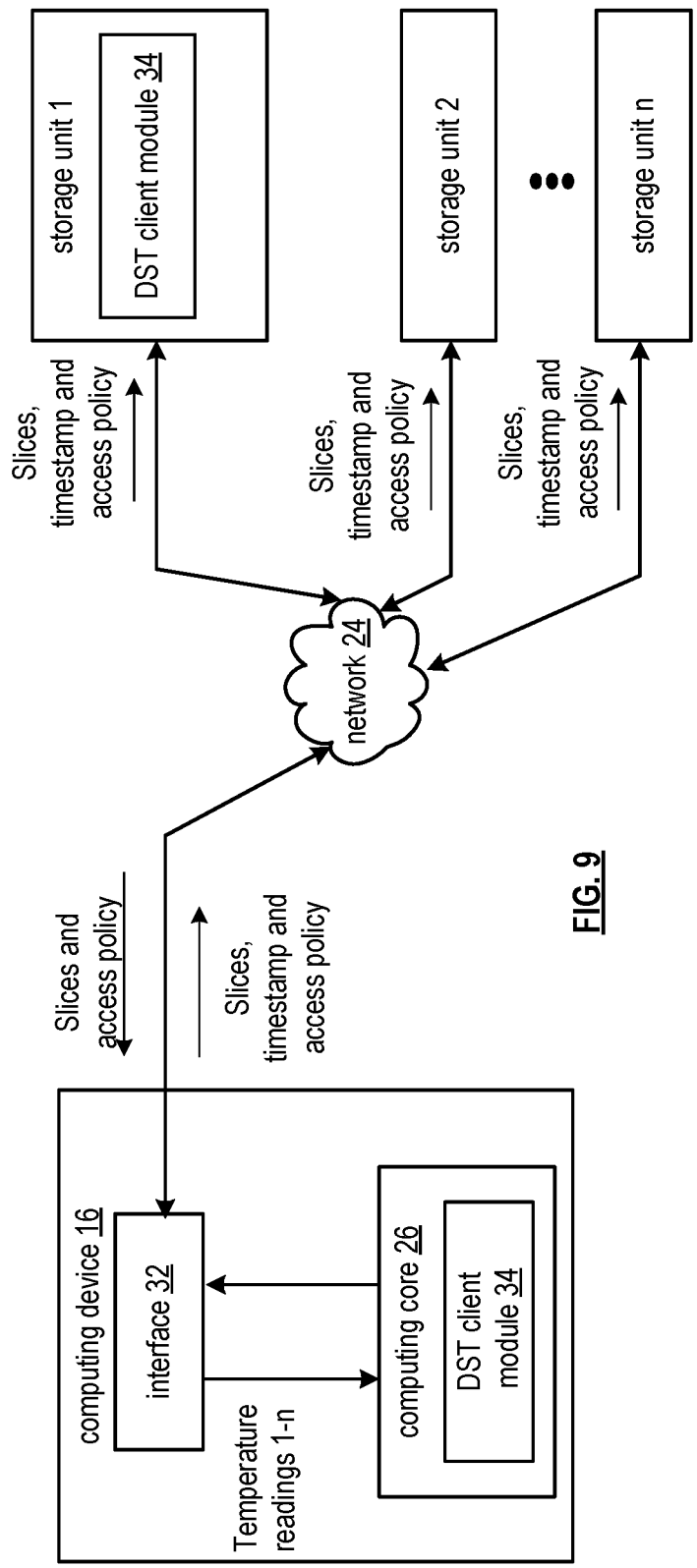
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a computing device 16 of FIG. 1, the network 24 of FIG. 1, and a storage units 1-*n*. The computing device 16 can include the interface 32 of FIG. 1, the computing core 26 of FIG. 1, and the DS client module 34 of FIG. 1. The computing device 16 can function as a dispersed storage processing agent for computing device 14 as described previously, and may hereafter be referred to as a distributed storage and task (DST) processing unit.

The DSN functions to store an access policy in association with stored slices, that for example, can be used to determine the availability these slices. In an example, the DS managing unit 18 determines the access policy. In other examples however, the access policy, may be previously determined by a user device, a DS processing unit, a storage integrity processing unit, or another DS unit. The access policy may include a time varying availability pattern of a DS unit, a pillar, and/or a vault. For example, the pattern indicates that vault 1 is available to any user from noon to midnight every day and is not available from midnight to noon. In another example, the pattern indicates that pillar 2 of vault 3 is available to any user from noon to midnight every day and is not available from midnight to noon. In another example, the pattern indicates that pillar 2 of vault 3 is available only to user 5 from noon to midnight every day and is available to the DS managing unit 24 hours a day. In an example, the DSN stores slices in a main slice memory and the slice names, access policy, and optionally other information associated with the slices in a local virtual DSN address to physical location table record such that each is linked to the other for subsequent simultaneous retrieval. Further examples of access policies are presented in conjunction with FIGS. 10A-10C.

In various embodiments, a processing system of a dispersed storage and task (DST) processing unit comprises at least one processor and a memory that stores operational instructions, that when executed by the at least one processor, cause the processing system to: receive a write threshold number of slices of a data object and an access policy that corresponds to the slices; determine a current timestamp that indicates a current time value; and store the write threshold number of slices, the access policy, and the timestamp in a plurality of storage units of a dispersed storage network (DSN).

In various embodiments, the write threshold number of slices are received from at least one of: a user device, a DST processing unit, a storage integrity processing unit, a managing unit, or another DST execution unit. The access policy can be predetermined by the managing unit in association with the write threshold number of slices. The access policy can include a time varying availability pattern of at least one of: a DST execution unit or other DS unit, a pillar, or a vault. The current time value can be determined by a processing system clock. Storing the write threshold number of slices, the access policy, and the timestamp can include storing slice names associated with the write threshold number of slices, the access policy, and the timestamp with a local virtual DSN address to a physical location table record. The physical location table record can, for example, links the slice names, the access policy, and the timestamp to one another for subsequent retrieval contemporaneously, together and/or as a group.

FIGS. 10A-10C are schematic block diagrams of embodiments of a dispersed storage network (DSN) memory storage sets. As illustrated, FIGS. 10A-C represent DSN memory storage sets 148-152 (e.g., the set of DS units that store all the pillars of a common data segment) comprising six DS units 1-6. For example, pillar 1 slices are stored in DS unit 1, pillar 2 slices are stored in DS unit 2, pillar 3 slices are stored in DS unit 3, pillar 4 slices are stored in DS unit 4, pillar 5 slices are stored in DS unit 5, pillar 6 slices are stored in DS unit 6 when the operational parameters include a pillar width of n=6 and a read threshold of 4. As illustrated, FIGS. 10A-C indicate access policy patterns, such as slice availability patterns in accordance with an access policy.

Figure 10:
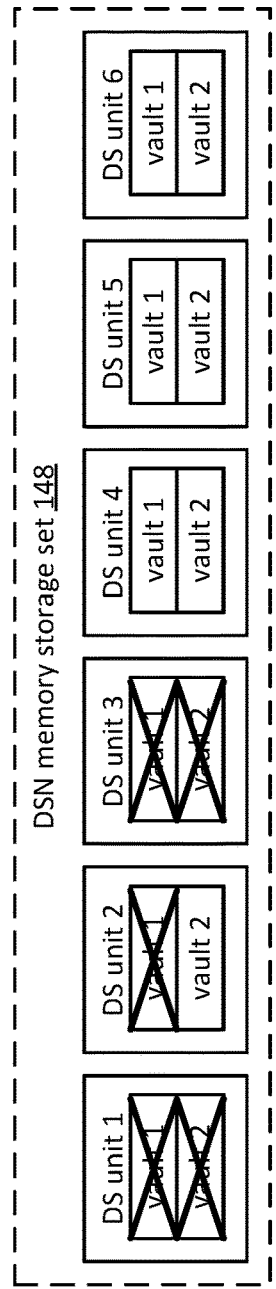
FIGS. 10A-10C are schematic block diagrams of embodiments of a dispersed storage network (DSN) memory storage sets.
Figure 10:
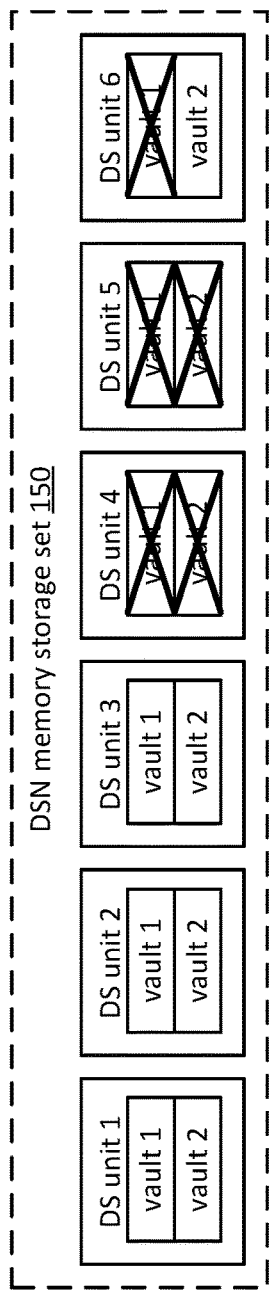
Figure 10:
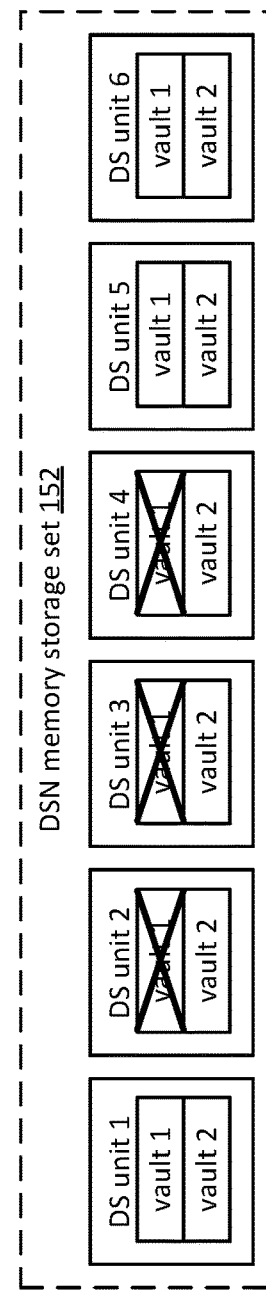

As illustrated, FIG. 10A indicates an access policy pattern from the hours of 12:00 AM to 6:00 AM, FIG. 10 B illustrates an access policy pattern from the hours of 6:00 AM to 7:00 PM, and FIG. 10 C illustrates an access policy pattern from the hours of 7:00 PM to 12:00 AM. Note that the access policy pattern may vary second by second, minute by minute, day by day, month-by-month, etc.

Based on these access policy patterns, DS units may read and/or write slices in vault 1 and/or vault 2 during the specified times of day when the particular vault does not include an X. For example, the pillar 2 for vault 1 is not available from 12:00 AM to 6:00 AM and the pillar 2 for vault 2 is available from 12:00 AM to 6:00 AM as illustrated by FIG. 10 A.

Note that the access policy pattern may be utilized to impact data security and performance of the system. For example, the pattern may enable all of the pillars of a vault to be available in any one or more time frames to improve system performance. In another example, the pattern may enable just a read threshold of the pillars of a vault to be available in any one or more time frames to improve system security but maintain a moderate level of system performance (e.g., as long as those exact pillars remain active). In another example, the pattern may never enable a read threshold of the pillars of a vault to be available in any single time frame to improve system security. In that scenario the pattern may enable a read threshold of the pillars of a vault to be available across two or more time frames. As illustrated, vault 1 never has a read threshold (e.g., four pillars) number of pillars available in any one of the three time periods. For example, only pillars 4-6 are available for vault 1 from 12:00 AM to 6:00 AM, only pillars 1-3 are available for vault 1 from 6:00 AM to 7:00 PM, and only pillars 1, 5, 6 are available for vault 1 from 7:00 PM to 12:00 AM. As illustrated, the data segments may be retrieved from vault 1 by access vault 1 across two timeframes. For example, a DS processing unit may reconstruct a vault 1 data segment by retrieving slices of vault 1 from DS units 4-6 during the 12:00 AM-6:00 AM timeframe, followed by retrieving slices of vault 1 from any one or more of DS units 1-3 during the 6:00 AM-7:00 PM timeframe.

Figure 11:
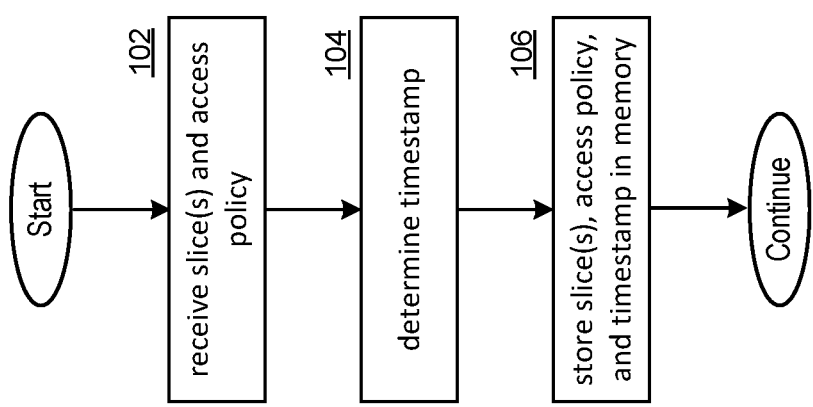
FIG. 11 is a flowchart illustrating an example of retrieving encoded data slices.

FIG. 11 is a flowchart illustrating an example of retrieving encoded data slices. In particular, a method is presented for use in association with one or more functions and features described in conjunction with FIGS. 1-10 for execution by a dispersed storage and task (DST) execution unit that includes a processor or via another processing system of a dispersed storage network that includes at least one processor and memory that stores instruction that configure the processor or processors to perform the steps described below. In step 102, a processing system receives slice(s), slice names, and an access policy from any one of a user device, a DS processing unit, a storage integrity processing unit, a DS managing unit, and another DS unit. Note that the access policy may be previously determined by any one or more of the user device, the DS processing unit, the storage integrity processing unit, the DS managing unit, and another DS unit. In an example, the DS managing unit determines the access policy. The access policy may include a time varying availability pattern of a DS unit, a pillar, and/or a vault. For example, the pattern indicates that vault 1 is available to any user from noon to midnight every day and is not available from midnight to noon. In another example, the pattern indicates that pillar 2 of vault 3 is available to any user from noon to midnight every day and is not available from midnight to noon. In another example, the pattern indicates that pillar 2 of vault 3 is available only to user 5 from noon to midnight every day and is available to the DS managing unit 24 hours a day. The access policy determination is discussed in greater detail with reference to FIGS. 9-11.

At step 104, the processing system determines a current timestamp based on a time function of an associated computing core 26 or of the computing system. For example, the processing system determines the timestamp based on retrieving a current time value from a Unix clock (e.g., Unix time, POSIX time). At step 106, the processing system stores the slices, slice names, access policy, and timestamp in a memory (e.g., a local memory associated with a DS unit). In an example, the processing system stores the slices in a main slice memory and the slice names, access policy, and timestamp in a local virtual DSN address to physical location table record such that each is linked to the other for subsequent simultaneous retrieval.

In various embodiments, a non-transitory computer readable storage medium includes at least one memory section that stores operational instructions that, when executed by a processing system of a dispersed storage network (DSN) that includes a processor and a memory, causes the processing system to receive a write threshold number of slices of a data object and an access policy; determine a current timestamp that indicates a current time value; and store the write threshold number of slices, the access policy, and the timestamp in a plurality of storage units of a dispersed storage network (DSN).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    storing, by a computing device, a plurality of slice retrieval information for various instances of an access policy, wherein the various instances of the access policy comprises a set of instances of the access policy that each indicate a subset of a set of pillars of a vault that are available during a corresponding one of a plurality of time periods, wherein a read threshold number of the set of pillars of the vault are not available in any single one of the plurality of time periods;
    receiving, by the computing device, a first data access request;
    generating, by the computing device, a first timestamp for the first data access request, wherein the first timestamp is generated by associating a first current time with the first data access request;
    determining, by the computing device, a first instance of the various instances of the access policy based on the first timestamp corresponding to a first time period of the plurality of time periods;
    determining, by the computing device, a first one of the plurality of slice retrieval information based on the first instance;
    retrieving, by the computing device, a first set of encoded data slices of a data segment in accordance with the first one of the plurality of slice retrieval information, wherein the first set of encoded data slices includes less than a read threshold number of encoded data slices;
    receiving, by the computing device, a second data access request;
    generating, by the computing device, a second timestamp for the second data access request, wherein the second timestamp is generated by associating a second current time with the second data access request;
    determining, by the computing device, a second instance of the various instances of the access policy based on the second timestamp corresponding to a second time period of the plurality of time periods;
    determining, by the computing device, a second one of the plurality of slice retrieval information based on the second instance;
    retrieving, by the computing device, a second set of encoded data slices of the data segment in accordance with the second one of the plurality of slice retrieval information, wherein the second set of encoded data slices includes less than the read threshold number of encoded data slices; and recovering, by the computing device, the data segment by utilizing the first set of encoded data slices and the second set of encoded data slices, wherein a union of the first set of encoded data slices and the second set of encoded data slices includes at least the read threshold number of encoded slices.

2. The method of claim 1, wherein the various instances of the access policy further comprises:
a third instance of the access policy in which one or more vaults are unavailable for a first third time period;
a fourth instance of the access policy in which one or more pillars are unavailable for a fourth time period;
a fifth instance of the access policy in which one or more storage units are unavailable for a fifth time period;
a sixth instance of the access policy includes time-based access privileges of a user device; and
a seventh instance of the access policy that includes one or more of the third, fourth, fifth, and sixth instances.

3. The method of claim 1, wherein the plurality of slice retrieval information further comprises:
third slice retrieval information that includes a list of vaults that are available a third time period;
fourth slice retrieval information that includes a list of pillars that are available a fourth time period;
fifth slice retrieval information that includes a list of storage units that are available a fifth time period;
sixth slice retrieval information that includes a list of time-based access privileges of a user device; and
seventh slice retrieval information that includes one or more of the third, fourth, fifth, and sixth slice retrieval information, wherein the first one of the plurality of slice retrieval information includes one of the third, fourth, fifth, sixth, and seventh slice retrieval information.

4. The method of claim 1, wherein the access policy is predetermined based on a write threshold number of encoded data slices.

5. The method of claim 1, wherein storing one of the plurality of slice retrieval information includes:
retrieving, for a previous data access request, an encoded data slice in accordance with one instance of the various instances of the access policy; and
storing, within local memory of the computing device, the encoded data slice for the first one of the plurality of slice retrieval information, wherein the first one of the plurality of slice retrieval information corresponds to the first instance of the various instances of the access policy;
wherein at least one of the encoded data slices of the first set of encoded data slices is determined in accordance with the first data access request based on the first one of the plurality of slice retrieval information, and wherein the at least one of the encoded data slices is retrieved from the local memory of the computing device; and
wherein the at least one of the encoded data slices retrieved from the local memory of the computing device includes the encoded data slice retrieved for the previous data access request.

6. The method of claim 5, wherein storing another one of the plurality of slice retrieval information comprises:
retrieving, for a second previous data access request, a slice name in accordance with another instance of the various instances of the access policy; and
storing, within local memory of the computing device, the slice name for the another one of the plurality of slice retrieval information, wherein the another one of the plurality of slice retrieval information corresponds to another instance of the access policy.

7. The method of claim 6 further comprises:
determining, in accordance with a third data access request, available storage units based on the first one of the plurality of slice retrieval information; and
retrieving one or more of the encoded data slices from the available storage units.

8. A processing system of a dispersed storage (DS) processing unit comprises:
at least one processor;
a memory that stores operational instructions, that when executed by the at least one processor cause the processing system to:
store a plurality of slice retrieval information for various instances of an access policy, wherein the various instances of the access policy comprises a set of instances of the access policy that each indicate a subset of a set of pillars of a vault that are available during a corresponding one of a plurality of time periods, wherein a read threshold number of the set of pillars of the vault are not available in any single one of the plurality of time periods;
receive a first data access request;
generate a first timestamp for the first data access request, wherein the first timestamp is generated by associating a first current time with the first data access request;
determine a first instance of the various instances of the access policy based on the first timestamp corresponding to a first time period of the plurality of time periods;
determine, a first one of the plurality of slice retrieval information based on the first instance;
retrieve a first set of encoded data slices of a data segment in accordance with the first one of the plurality of slice retrieval information, wherein the first set of encoded data slices includes less than a read threshold number of encoded data slices;
receive a second data access request;
generate a second timestamp for the second data access request, wherein the second timestamp is generated by associating a second current time with the second data access request;
determine a second instance of the various instances of the access policy based on the second timestamp corresponding to a second time period of the plurality of time periods;
determine a second one of the plurality of slice retrieval information based on the second instance;
retrieve a second set of encoded data slices of the data segment in accordance with the second one of the plurality of slice retrieval information, wherein the second set of encoded data slices includes less than the read threshold number of encoded data slices; and
recover the data segment by utilizing the first set of encoded data slices and the second set of encoded data slices, wherein a union of the first set of encoded data slices and the second set of encoded data slices includes at least the read threshold number of encoded slices.

9. The processing system of claim 8, wherein the various instances of the access policy further comprises:
a third instance of the access policy in which one or more vaults are unavailable for a third time period;
a fourth instance of the access policy in which one or more pillars are unavailable for a fourth time period;

a fifth instance of the access policy in which one or more storage units are unavailable for a fifth time period;

a sixth instance of the access policy includes time-based access privileges of a user device; and a seventh instance of the access policy that includes one or more of the third, fourth, fifth, and sixth instances.

10. The processing system of claim 8, wherein the plurality of slice retrieval information further comprises:

first third slice retrieval information that includes a list of vaults that are available a third time period;

fourth slice retrieval information that includes a list of pillars that are available a fourth time period;

fifth slice retrieval information that includes a list of storage units that are available a fifth time period;

sixth slice retrieval information that includes a list of time-based access privileges of a user device; and seventh slice retrieval information that includes one or more of the third, fourth, fifth, and sixth slice retrieval information, wherein the first one of the plurality of slice retrieval information includes one of the third, fourth, fifth, sixth, and seventh slice retrieval information.

11. The processing system of claim 8, wherein the access policy is predetermined based on a write threshold number of encoded data slices.

12. The processing system of claim 8, wherein storing one of the plurality of slice retrieval information includes:

retrieving, for a previous data access request, an encoded data slice in accordance with one instance of the various instances of the access policy; and storing, within local memory of the DS processing unit, the encoded data slice for the first one of the plurality of slice retrieval information, wherein the first one of the plurality of slice retrieval information corresponds to the first instance of the various instances of the access policy;

wherein at least one of the encoded data slices of the first set of encoded data slices is determined in accordance with the first data access request based on the first one of the plurality of slice retrieval information, and wherein the at least one of the encoded data slices is retrieved from the local memory of the DS processing unit; and wherein the at least one of the encoded data slices retrieved from the local memory of the DS processing unit includes the encoded data slice retrieved for the previous data access request.

13. The processing system of claim 12, wherein the processor is operable to store another one of the plurality of slice retrieval information by:

retrieving, for a second previous data access request, a slice name in accordance with another instance of the access policy; and storing, within local memory of the DS processing unit, the slice name for the another one of the plurality of slice retrieval information, wherein the another one of the plurality of slice retrieval information corresponds to another instance of the access policy.

14. The processing system of claim 13, wherein the processor is further operable to:

determine, in accordance with a third data access request, available storage units based on the first one of the plurality of slice retrieval information; and retrieve one or more of the encoded data slices from the available storage units.

15. A non-transitory computer readable storage medium comprises:

at least one memory section that stores operational instructions that, when executed by a processing system of a dispersed storage network (DSN) that includes a processor and a memory, causes the processing system to:

store a plurality of slice retrieval information for various instances of an access policy, wherein the various instances of the access policy comprises a set of instances of the access policy that each indicate a subset of a set of pillars of a vault that are available during a corresponding one of a plurality of time periods, wherein a read threshold number of the set of pillars of the vault are not available in any single one of the plurality of time periods;

receive a first data access request;

generate a first timestamp for the first data access request, wherein the first timestamp is generated by associating a first current time with the first data access request;

determine a first instance of the various instances of the access policy based on the first timestamp corresponding to a first time period of the plurality of time periods;

determine, a first one of the plurality of slice retrieval information based on the first instance;

retrieve a first set of encoded data slices of a data segment in accordance with the first one of the plurality of slice retrieval information, wherein the first set of encoded data slices includes less than a read threshold number of encoded data slices;

receive a second data access request;

generate a second timestamp for the second data access request, wherein the second timestamp is generated by associating a second current time with the second data access request;

determine a second instance of the various instances of the access policy based on the second timestamp corresponding to a second time period of the plurality of time periods;

determine a second one of the plurality of slice retrieval information based on the second instance;

retrieve a second set of encoded data slices of the data segment in accordance with the second one of the plurality of slice retrieval information, wherein the second set of encoded data slices includes less than the read threshold number of encoded data slices; and recover the data segment by utilizing the first set of encoded data slices and the second set of encoded data slices, wherein a union of the first set of encoded data slices and the second set of encoded data slices includes at least the read threshold number of encoded slices.

16. The non-transitory computer readable storage medium of claim 15, wherein the various instances of the access policy further comprises:

a third instance of the access policy in which one or more vaults are unavailable for a third time period;

a fourth instance of the access policy in which one or more pillars are unavailable for a fourth time period;

a fifth instance of the access policy in which one or more storage units are unavailable for a fifth time period;

a sixth instance of the access policy includes time-based access privileges of a user device; and a seventh instance of the access policy that includes one or more of the third, fourth, fifth, and sixth instances.

17. The non-transitory computer readable storage medium of claim 15, wherein the plurality of slice retrieval information comprises:

further comprises:
third slice retrieval information that includes a list of vaults that are available a third time period;
fourth slice retrieval information that includes a list of pillars that are available a fourth time period;
fifth slice retrieval information that includes a list of storage units that are available a fifth time period;
sixth slice retrieval information that includes a list of time-based access privileges of a user device; and
seventh slice retrieval information that includes one or more of the third, fourth, fifth, and sixth slice retrieval information, wherein the first one of the plurality of slice retrieval information includes one of the third, fourth, fifth, sixth, and seventh slice retrieval information.

18. The non-transitory computer readable storage medium of claim 15, wherein the access policy is predetermined based on a write threshold number of encoded data slices.

19. The non-transitory computer readable storage medium of claim 15, wherein storing one of the plurality of slice retrieval information includes:
retrieving, for a previous data access request, an encoded data slice in accordance with one instance of the various instances of the access policy; and
storing, within local memory, the encoded data slice for the first one of the plurality of slice retrieval information, wherein the first one of the plurality of slice retrieval information corresponds to the first instance of the various instances of the access policy;
wherein at least one of the encoded data slices of the first set of encoded data slices is determined in accordance with the first data access request based on the first one of the plurality of slice retrieval information, and wherein the at least one of the encoded data slices is retrieved from the local memory; and
wherein the at least one of the encoded data slices retrieved from the local memory includes the encoded data slice retrieved for the previous data access request.

20. The non-transitory computer readable storage medium of claim 19, wherein the processing system is operable to:
store another one of the plurality of slice retrieval information by:
retrieving, for a second previous data access request, a slice name in accordance with another instance of the access policy;
storing, within local memory, the slice name for the another one of the plurality of slice retrieval information, wherein the another one of the plurality of slice retrieval information corresponds to another instance of the access policy; and
when receiving a third data access request:
determine, in accordance with the third data access request, available storage units based on the another one of the plurality of slice retrieval information; and
retrieve one or more of the encoded data slices from the available storage units.

* * * * *